US009454840B2

(12) United States Patent
Caldwell

(10) Patent No.: US 9,454,840 B2
(45) Date of Patent: Sep. 27, 2016

(54) SYSTEM AND METHOD FOR INTERACTIVE ANIMATIONS FOR ENHANCED AND PERSONALIZED VIDEO COMMUNICATIONS

(71) Applicant: Blake Caldwell, Venice, CA (US)

(72) Inventor: Blake Caldwell, Venice, CA (US)

( * ) Notice: Subject to any disclaimer, the term of this patent is extended or adjusted under 35 U.S.C. 154(b) by 0 days.

(21) Appl. No.: 14/569,577

(22) Filed: Dec. 12, 2014

(65) Prior Publication Data

US 2015/0172599 A1 Jun. 18, 2015

Related U.S. Application Data

(60) Provisional application No. 61/916,096, filed on Dec. 13, 2013.

(51) Int. Cl.
*H04N 7/15* (2006.01)
*G06T 13/40* (2011.01)
*H04N 21/4788* (2011.01)

(52) U.S. Cl.
CPC ............... *G06T 13/40* (2013.01); *H04N 7/157* (2013.01); *H04N 21/4788* (2013.01)

(58) Field of Classification Search
CPC ..... H04N 7/15; H04N 21/4788; G06T 13/40
USPC ...... 345/419, 473, 156; 348/14.03; 352/285, 352/101; 463/31; 472/43; 709/217, 227; 382/285; 700/94, 233; 715/839; 725/25, 38
See application file for complete search history.

(56) References Cited

U.S. PATENT DOCUMENTS

| | | | | |
|---|---|---|---|---|
| 5,513,117 A * | 4/1996 | Small | ................... | G07F 17/0042 235/381 |
| 6,292,827 B1 * | 9/2001 | Raz | ................... | H04L 29/06 709/217 |
| 6,677,967 B2 * | 1/2004 | Sawano | ................... | G06T 19/20 715/716 |
| 7,509,178 B2 * | 3/2009 | Logan | ................... | G06F 17/30053 700/94 |
| 7,940,371 B2 * | 5/2011 | Barnett | ................... | G03B 25/00 352/101 |
| 8,025,581 B2 * | 9/2011 | Bryan | ................... | G05G 7/02 463/2 |
| 8,737,767 B2 * | 5/2014 | Hodgins | ................... | G06F 17/50 382/285 |
| 8,799,940 B2 * | 8/2014 | Teniou | ................... | H04N 21/234318 348/43 |
| 2006/0123053 A1 * | 6/2006 | Scannell | ................... | G06F 17/30035 |
| 2006/0212579 A1 * | 9/2006 | Wu | ................... | H04L 65/4092 709/227 |
| 2010/0167255 A1 * | 7/2010 | Shane | ................... | G09B 7/00 434/307 R |
| 2011/0107369 A1 * | 5/2011 | O'Brien | ................... | G06F 17/30029 725/38 |
| 2013/0083011 A1 * | 4/2013 | Geisner | ................... | G09G 5/00 345/419 |
| 2013/0106686 A1 * | 5/2013 | Bennett | ................... | G06F 3/017 345/156 |
| 2013/0257877 A1 * | 10/2013 | Davis | ................... | G06T 13/80 345/473 |
| 2014/0132594 A1 * | 5/2014 | Gharpure | ................... | G06T 15/205 345/419 |
| 2014/0213362 A1 * | 7/2014 | Perlman | ................... | A63F 13/12 463/31 |
| 2015/0172599 A1 * | 6/2015 | Caldwell | ................... | H04N 7/157 348/14.03 |

* cited by examiner

*Primary Examiner* — Gerald Gauthier
(74) *Attorney, Agent, or Firm* — Peter B. Scull; Hamilton DeSanctis & Cha, LLP

(57) ABSTRACT

A videoconferencing system and method using personalized, 3D interactive animations across screen barriers. Via auditory, behavior, visual, or computer-inputted cues, preloaded images, sounds, and gestures as well as customized images, sounds, and gestures can be manipulated and sent into and across one or more videoconference feeds in the form of animated sequences. These images, sounds, and gestures can be mapped onto the images of users' faces or other features within the video feed frame.

12 Claims, 3 Drawing Sheets

US 9,454,840 B2

SYSTEM AND METHOD FOR INTERACTIVE ANIMATIONS FOR ENHANCED AND PERSONALIZED VIDEO COMMUNICATIONS

CROSS-REFERENCE TO RELATED APPLICATION

This application claims priority to U.S. Provisional Application No. 61/916,096, filed Dec. 13, 2013, the disclosure of which, including any materials incorporated therein by reference, is incorporated herein by reference in its entirety.

BACKGROUND OF THE INVENTION

Video conferencing has evolved over the past several years from a simplistic, two-party video communication system to a more advanced, multi-party video communication system, for example, through use of 2D animated overlays and rendering solutions. Some solutions such as Skype®, Google Hangout®, and Tango® have evolved in the space of video communications and conferencing technologies. For example, Google Hangout® uses 2D artificial visual add-ons such as an image of sunglasses overlaid on the real-time video frames during a live video conferencing session so that it looks like the user is wearing sunglasses. Similarly, Tango® provides 2D animations that run over the top of the video screen. For example, a user in Tango® can have hearts float up the screen. While Hangouts® may have 2D images that interact with the user through their facial position, Tango® does not have even offer interactive 2D animations.

Further, video messaging has traditionally been non-interactive, where a sender simply captures a video and sends it as a message to one or more receivers. The receiver(s) use a suitable display device to receive the message and plays it back. Video messaging is similar to text messaging, except that a user sends a video clip instead of a text message. Like text messaging, video messaging can be sent in a one-to-one or one-to-many fashion. The responses can occur in a similar manner. The one-to-many model is often called group messaging.

In prior video messaging systems, communication has been a non-real time, non-interactive, one-way user experience. In other words, the sender (first user) of the message is unable to truly interact with receiver (second user) because the sender is unable to see the reaction and/or emotional expressions of the receiver to his/her message at the time the message is actually received.

All of these technologies have advanced in the past years by the pervasiveness of front-facing camera technology (integrated and mount solutions) with several consumer electronics devices like phones, tablets, TVs, monitors, laptops, computing devices, etc.

In prior systems, users have limited options with respect to animations, images, and sounds because they are a pre-defined set of pre-rendered assets. Further, these are not generated in response to captured human actions or emotional expressions (disregarding the basic use of a computer mouse or finger on a touch screen).

Current videoconferencing models are hence limited by a so-called "screen barrier," keeping the images in one user's camera feed out of the other user's video feed, and vice versa. In prior videoconferencing systems and methods, such as U.S. Patent Application Publication No. 2007/0242066 and U.S. Patent Application No. 2012/00069028, both of which are hereby incorporated by reference herein, an image appearing in the video feed on the left has no ability to "move along" an axis and enter the video feed on the right, for example.

U.S. Pat. No. 8,099,462 similarly discloses a method of displaying interactive effects in web camera communication, which is hereby incorporated by reference in its entirety. U.S. Patent Application Publication No. 2011/0025689, also incorporated by reference herein in its entirety, discloses a technique for auto-generating a target's visual representation. U.S. Patent Application Publication No. 2012/0069028 discloses use of video emoticons and U.S Patent Application Publication No. 2007/0216675 describes digital video effects, both applications, which are incorporated herein by reference in their entireties.

These teachings, however, among other things, do not allow a user to customize or personalize an animation sequence.

The present invention addresses, inter alia, this screen barrier problem, as well as other problems prevalent in the art. An exemplary system and method in accordance with the present invention utilizes the videoconference camera, activates motion-capture technology, captures one or more images from the video feed, and uses those images in personalized animation sequences.

SUMMARY OF THE INVENTION

In a videoconference environment, there are at least two users or participants who can interact with each other. There can be, of course, more than two users or participants. Each user can see his or her own image, as well as the image of the other user(s) or participant(s). Even though the users are, in a sense, brought closer together by video chat technology, they are still separated by a screen, or "screen barrier," which inherently keeps each user or participant isolated from the other(s). The screen barrier can be conceptualized in two fashions. The first is the physical separation. Using a videoconference with two participants as an example, there exists a barrier in the form of the physical screen and physical distance from that screen separating the two participants. Although one participant may appear inches away in physical distance, the other participant cannot physically reach into the participant's space that is captured by the video camera. They cannot touch each other or impact each other's space. The concept of the screen barrier can be further taken into the digital space, where, although both video feeds (captured from each participant) can be seen side-by-side arrangement on each screen, there is not any actual interaction between the two screens. Much like how a participant cannot physically reach through the screen to impact the space of the other participant, that participant has the same restrictions placed upon them in their captured video feeds. Although both video feeds (captured from each participant) can be seen in a side-by-side arrangement on each screen, there is not any interaction between the two video feeds even though they are digital. The participant on the left arranged video feed cannot reach into the video feed of the right arranged participant. Similarly, if the two video feeds were presented in an upper and lower arrangement, an image seen in the bottom video panel has no ability to "move" from one video panel to another. Similar screen barriers can exist between any two or more videoconference video feeds arranged in a variety of configurations.

An exemplary system and method in accordance with the present invention can, for example, provide for a more interactive videoconferencing experience through interactive animations that cross this "screen barrier." The term "screen" is here used to refer to any screen capable of being used in a videoconference, such as, but not by way of limitation to a computer screen, tablet screen, television screen, smart phone screen, or projection screen (where the surface upon which the projection occurs can be 2D, for example, a wall, or 3D, for example, a cloud of smoke.) The present disclosure contemplates systems and methods described herein operating similarly on any and all capable screens, not merely those listed herein.

Certain exemplary embodiments of the present system and method allow a user to generate new images that can be used in the personalized animation sequences through gestures. In certain embodiments, the present system and method utilizes the videoconference camera, activates motion-capture technology, captures one or more gesture sequences consisting of bodily gestures or gestures made with a stylus from the video feed, and uses those images in personalized animation sequences.

One exemplary embodiment of the system and method provides dynamic and real-time animated images or objects, (the terms "images" and "objects" when in reference to visual items in a video feed or video panel are here used interchangeably), by using advanced augmented reality tools. These objects are not confined to a predetermined sequence of frames or confined to one user's video feed. For example, one user is able to send a kiss from the video feed of one user to the other. For a user to send a kiss during the video chat session, the system and method could not only auto respond with "personalized visual objects," for example, a user's lips, but also augment the real expression of the kiss with a continuous motion of flying object of the user's lips which lands on the other user's cheek or lips on his or her video feed. The lips, for example, can start on one user's video feed and seamlessly end on the other feed, effectively breaking down the screen barrier. Both users see the entire sequence, which includes an activation event and resultant action.

Examples of such activation events are: a gesture, an expression, an audio cue such as a particular noise or utterance of either party or user to the videoconference or video messaging session, or a combination of audio and visual cues, such as the user making the real-life motion of blowing a kiss with a smooch sound. A resultant action is a nearly infinite set of customizable multi-dimensional (2D or 3D) objects that are dynamically generated or static objects with dynamic customization based on the system and method's contextual awareness as processed by the system and method's software product during the video conferencing or messaging session.

To detect the activation events, the system and method in accordance with the present invention first detects and then parses the various cues in the audio and video streams. Other capture devices, such as hand tracking devices, can also be used. One example of many could be: parsing the audio stream and performing a speech to text conversion in real time to detect words or phrase like "I love you" when uttered by a participant to the videoconference. Another example of many could be detecting and then parsing behavioral and/or visual cues, such as a user's finger-movements, movements using a stylus, motions such as the "motion of blowing a kiss." These activation events are detected by the software, which triggers the resultant actions. In the alterative, an activation event could also be pressing a key on a keyboard. The resultant image would be a 2D or 3D object. Using the example of the flying kiss, the system and method in accordance with the present invention would generate a 3D object representing the lips of the user, which would then fly out of the users screen and into his girlfriend's screen, landing on the lips of his girlfriend (in the video feed). This 3D object can be a predefined 3D model of the lips with dynamic customizations of the user's lips or the 3D model could be a contextually aware real-time (dynamic) capture of the 3D image of the user's lips.

Further, the girlfriend's response, for example, could be a kiss back. The direct "expression of kissing back" or an indirect "expression of saying I love you, too" could be an activation event trigger for the girlfriend's video capture feed and the software can detect these activation events automatically (as before) and create a multi-dimensional object as her resultant action.

In addition, the context-aware multi-dimensional customized animations can be text transformed into 3D animation texts and overlaid on an animated object, for example, an animation of a flying plane with a banner behind it with the animated text on it. Alternatively, snippets of the actual video can also be transformed onto a 3D object. For instance, the video can play on someone's name or it can be integrated into a visual object on the screen, for example, by transforming it into a 3D beach towel and integrating into a custom ocean background or integrating it onto the surface of a sphere or other objects. To implement this, the video can be used as the texture of the objects. An object model can be created and then "painted" with the video texture. So instead of traditional static textures, the texture would be continually changing. That would allow having the video of the user on nontraditional backgrounds that move.

As mentioned above, during a videoconference or video messaging session, a user can use his/her finger (or other feature) as a light pen and create real-time animations. For example, the user could draw a hat using his finger (touching a screen or drawing out in mid-air). In the videoconferencing scenario, this screen area could be the video feed of any of the users and/or a separate screen area (for example, a side video). In a video messaging scenario, the user could draw on any of the video feeds. Subsequent to drawing the animation using the finger as a light pen, the user can have the option to attach it to any object on the screen. For example, the user could draw a hat using his/her finger as a light pen and later place it on say, the head of his/her friend during the video conferencing session. The hat would then move on the screen according to that tracked object's (the head's) position. The key capability of being able to create a live light pen and draw real-time graphics (2D and 3D) and transition the graphics into the video feed with an animated flow empowers the users to dynamically generate context aware visuals and thus help them transform the video conferencing conversation to be more expressive and interactive. A user can also take a mouse or other pointing or drawing device and draw on his or her own screen or screen of the other user. For example, a user can draw a mustache on the other user's face, which then stays on the other user.

These animations also have the ability to move in and out of the screen. For instance, a balloon or other object animation could start in the video feed. The animation can continue up out of the feed onto whatever is around it. The reverse can be possible, too. For example, a squirrel can be shown to be crawling above the feed region, and then jumps down onto the feed and lands on the user's head. The squirrel is, in essence, breaking the digital screen barrier, as previously discussed.

These animations/models are context aware (that can interact with the user) and can be created not just by the creators of the software, but also by other animators and modelers. The system can allow for creating animations and attributing properties to the animations so that they know how to act. For instance, an animation of a flying kiss will know its starting point (the user's lips), its destination point (the other user's lips), and its actions it takes along the way (making a kissing sound and kissing animations when it reaches the destination).

The control interface can also be extended across multiple platforms and devices like using a second screen device (e.g., smartphone) to control the animations instead of having to use the control input devices of the primary screen (e.g., TV). The other device can be used to produce the activation events and then control the movement and behavior of the animations.

The present system and method also provides for targeted advertising with custom animations. A predefined set of 2D or 3D objects can be provided by the advertiser and displayed to the user. During the videoconference, the user may mention the word "sunglasses" or may be wearing one in reality or even have it positioned next to (and being captured in the video feed). If authorized by the user, the system and method in accordance with the present invention can supply this information to advertisers and provide custom animation of sunglasses to be overlaid on/with visual objects of the video feed.

The present system and method can also provide for non-intrusive or minimally intrusive advertisements that are also context aware. These "non-intrusive" advertisements can appear in unused areas of the screen and/or video feed and move out of the way if an image or object in the video feed moves into the area they are containing or the user requests them to move (shooing them away). For instance, a baby polar bear from a famed soda company can hang out on the top corner. If the user raises their hand, the polar bear would move away to a free space on the screen and potentially the user could also remove the animation completely off the screen. The system and method in accordance with the present invention can apply this behavior, where an element hovers in one location until "shooed" away or an object in the video feed moves into the element's area, to all types of models and animations, not solely advertisements.

The system and method in accordance with the present invention also can have applications in video messaging. A sender can send the video message along with a few interactive animations pertinent to the video message. When the receiver opens the video message recorded by the sender, the front facing camera of the receiver can also be turned on. While the receiver is viewing the message along with the front facing camera capturing the receiver, the animations can be activated and overlaid on the video capturing the receiver's face, for example, such as a kiss on the forehead of the receiver during the video message. The interactive animations will be sent along with the video message or they can be part of the video messaging platform installed on the sender and receiver device or a combination of both real-time transmission and inherent messaging platform support. When the receiver opens the video message to view it, the front facing and/or mounted camera can be activated to begin capturing the receiver. There can be an optional condition to require the user's face to be detected in order for the message to play or continue to be played. During the message, an interactive animation, for example, of the sender's lips, will fly into the receiver's video feed and be placed on the receiver's forehead in the receiver's video being captured. This interactive animation (of the sender's lips appropriately time synchronized with the audio feed of the message for flying into the receiver's screen and landing on the receivers forehead) can then complete the action of kissing on the receiver's forehead in the captured video.

The system and method thus also enables a non-real time video session between the sender and the receiver to share and interactively express a personalized experience; captures the receiver's response in real-time and send it back to the sender with animations from the receiver to sender; and makes the video messaging experience more conversational by allowing the second user to record a response using the system and method and send it back to the first user.

The present invention can enable a non-real time, interactive and personalized video messaging experience with the use of cameras (e.g., front facing or mounted cameras) and interactive animations integrated and/or built with a video messaging platform. The animations will be sent with the video message or will be part of the video messaging platform solution or a combination of both to support any further optimizations.

The present system and method thus can allow dynamic, personalized, real-time animated sequences to move from one screen to another during a video chat, a video message, or other comparable communication medium. These animation sequences, once created, may also interact with users such as change position or size with respect to the video region or having the user's stream appear on an object. The animated sequences can consist of audio, video, or a combination of audio and video elements.

The movement of the animated sequence can be triggered by cues in the audio, such as a particular noise or voice cue. These animated sequences can also be triggered by a visual cue, such as a movement or gesture.

The elements contained within the animation sequence can be drawn from a preloaded image or animated sequence bank, images tracked and captured by the video camera, or images selected by and loaded from advertisers via a third-party source such as an internet upload. The present system and method also allows a user to create images by using either a finger or a stylus to draw an object in the air, which is then captured by the system and method and transposed into an image used in an animation. The present system and method also provides for a voice-to-text feature that processes a user's speech, converts the speech to text, and applies the text into the video feed, either in isolation or in connection with an image.

One aspect of the present invention provides a system, method, and computer program product using dynamic, real-time, animated objects during a video chat or conference, which may have the ability to "move" from the screen of one user to the screen of another user. In one embodiment, each user can see his or her own image taken by a camera, as well as the image of the other user in a side-by-side or top-and-bottom layout. In one aspect, the first user can drag an icon, emoji, or animoji onto the image of the other user, and the icon, emoji, or animoji is activated to create an image or sound coming from the first user to the second user or vice versa. As such, the icon, emoji or animoji is interacting with both users instead of just with one user. This allows the sending user to see the reaction of the receiving user, allowing for a more real-time, human and realistic interaction.

In another aspect of the present invention, there can be an activation of an animated object that may be triggered by cues in the audio or video stream.

In another aspect of the present invention, the action that results from the activation can be customizable or predefined by a user.

In another aspect of the present invention, the activation feature, once triggered may be a video animation or an audio clip.

In another aspect of the present invention, a voice-to-text feature may be incorporated into the video animation.

In another aspect of the present invention, a stylus may be utilized to create animation that will identify a reference point on the video image and track its location.

In another aspect of the present invention, graphics from advertisers and/or advertisers' products or services may have their images animated to interact with the video stream.

"Dynamic" can be interchangeably used herein with "lively," "active," "energetic," "vigorous," "altering," "varying," "shifting," "moving," "exchanging," and synonyms thereof, although not limited to these.

"Video chat" can be interchangeably used with "video messaging," "teleconference," "video conversation," "telemeeting," "audiovisual," and synonyms thereof, although not limited to these.

"Animated" can be interchangeably used herein with "animation," "active," "lively," "energetic," "cartoon," "drawing," "caricature," "sketch," "picture," "graphics," "3D-model," "3D-animation," "2D-rendered animation," "illustration," "depiction," "exaggeration," "outline," "emoticon," "animoji," "emojicon" and synonyms thereof, although not limited to these.

"Action" can be used interchangeably herein with "activity," "movement," "act," "deed," "feat," "drive," "effort," "movement," "motion," and synonyms thereof, although not limited to these.

"Object" can be used interchangeably herein with "target," "entity," "body," "objective," "aim," "figure," "frame," and synonyms thereof, although not limited to these.

"Trigger" can be used interchangeably herein "activate," "cause," "generate," "source," "foundation," "root," "basis," "grounds," and synonyms thereof, although not limited to these.

"Interact" can be used interchangeably herein with "interrelate," "network," "relate," "intermingle," "interdepend," "link," "join," and synonyms thereof, although not limited to these.

"Ads" can be used interchangeably herein with "advertising," "promotion," "marketing," and synonyms thereof, although not limited to these.

"Interactive" can mean, for example, interacting with objects in or on the video feed, rather than just being present on the screen, i.e., without any knowledge of what is in or on the video feed.

"Video feed" can represent video captured from a camera, but also pre-recorded videos (e.g., YouTube® etc.), as well as static image or canvas as seen in the figures. "Video feed" and "video panel" can also be used interchangeably.

The summary presented herein is to introduce a number of concepts in a simplified form and is not intended to identify key, necessary, or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF THE INVENTION

The following description relates to some embodiments of the present invention pertaining to a system and method for interactive animations and personalized video communications in a videoconference environment.

Figure 1:
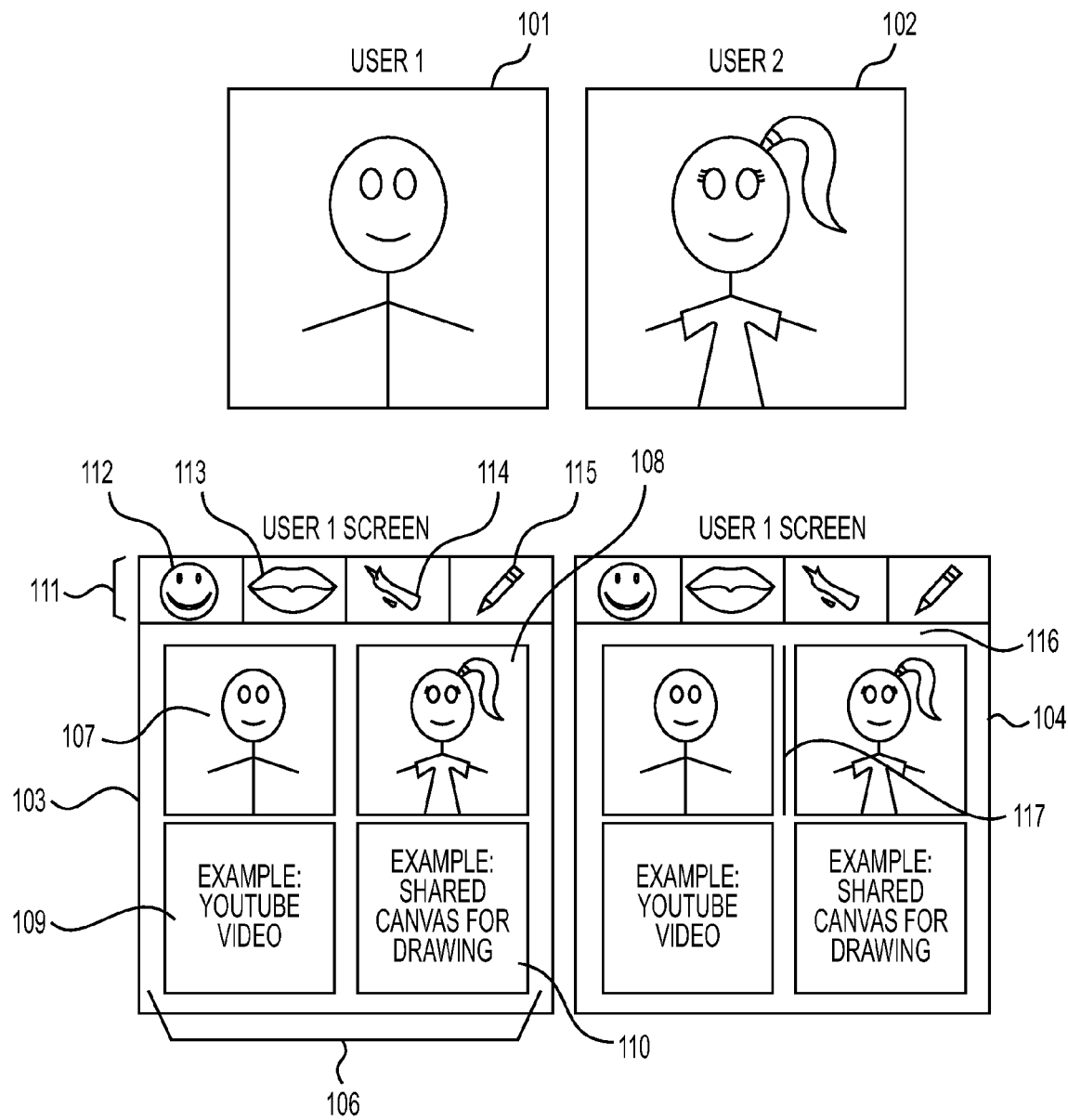
FIG. 1 shows a potential user interface in which a user can interact with the feeds and animations in accordance with one aspect of the present invention.

Turning now to the figures, FIG. 1 discloses one embodiment of a user interface according to the present embodiment. This interface allows a first user (USER 1) 101 to videoconference with a second user (USER 2) 102 by means of videoconferencing interfaces 103 and 104, which operate by transmitting video and audio between using cameras and microphones present in many computers, video game consoles, tablets, and smart phones, for example. In one embodiment, interfaces 103 and 104 use a form of videoconferencing, in which both parties or users appear onscreen simultaneously, either in a side-by-side or top and bottom configurations, for example. An alternate embodiment could include a system and/or method where one user sees mostly or only the other user. These are options that would be understood to those having ordinary skill in the art. FIG. 1. shows an exemplary screen barrier 117.

FIG. 1 also shows videoconferencing screens 103 and 104, each of which is arranged according to the four-panel layout 106. In this embodiment, the upper-left panel 107 shows one user and the upper-right panel 108 shows another user. The bottom-left panel 109 can contain pre-existing content that can be generated by either user or an independent third-party. Examples of such content could be non-real time video recordings or videos hosted on the internet. The bottom right panel 110, again, as only an example of one embodiment, contains a space for content generated by either user during the videoconference. Examples could be an uploaded photo or mouse-drawn content. Alternate embodiments of the present system and method could include the depicted four-panel layout 106 or various interface layouts consisting of more or fewer panels, the number and layout left to the users' option, for example.

FIG. 1 further discloses a selection area 111 that provides space for one or more icons, emoji, or animoji. In the embodiment shown, the selection area 111 provides space for four animations: a smiley face 112, lips 113, a finger 114, and a pencil 115. These icons provide both users to the videoconference with the ability to overlay an animation on the video image of either the first or second user in the respective panel.

The smiley face 112 illustrates one example of functionality with respect to static images. A user can select a smiley face 112 or another preloaded fixed image and select where the user would like the image placed—e.g., in either video panel 107 or 108, or both, and the image will behave as though it were a real object in that digital space. For example, assuming each user to the videoconference appears in one of panels 107 or 108, and their entire face is visible in the panel, the user could select a smiley face 112 and place the smiley face 112 on the image of the other user in the videoconference. Using 3D modeling and other techniques familiar to those of skill in the art, the smiley face 112 would appear on the other user's lips and behave as though it were a real object. In this manner, if the user turned his or her face the smiley face 112 would turn as well, changing size and/or shape to account for its changing distance from the camera. Both parties would be able to see the animation effects via the four-panel layout 106. Furthermore, because, in this exemplary embodiment, the video panels are side-by-side, and because this embodiment of the system and method uses techniques known to those in the art to create images that look and behave real, these animations appear to be "passed" from video panel to video panel. For example, the second user who accepted the smiley face 112 could remove it from his or her face in his or her video panel and pass it across the screen into the sending user's video panel. Other examples might include a balloon that floats up and out of one video panel and descends into the other video panel, or a beer mug that slides from one person's hand in one video panel and into the other person's hand in the other video panel. Those skilled in the art will appreciate that examples of such images and functionality are capable of vast variation. Hence, the present disclosure should not be understood as limiting the examples to only those listed herein.

An additional functionality of the system and method exists with respect to substituting advertising images for preloaded fixed images such as the smiley face 112. With this functionality, a user can select a pre-loaded group of, for example, designer sunglasses and use the system and method to overlay that image on the image of either the user's face or the other user's face. This image can behave in a similar manner as the smiley face 112 described above. Should a user or advertiser so choose, either user can select a link located anywhere on interfaces 103 or 104 that can connect the user with the advertiser's products.

Lips 113 illustrate one aspect of the present system and method's functionality with respect to pre-loaded animations that can respond to either a verbal or behavioral cue, for example. In this embodiment, the system and method described herein using software and techniques known to those of skill in the art could respond to a verbal cue such as "I love you" and, in the recipient's video panel, send a floating kiss onto the recipient's cheek or lips as visualized by lips 113 that move forward and eventually land on the recipient's cheek in the video panel. A similar effect could be achieved by using motion capture techniques known to those of skill in the art to detect a user's sign language and send an appropriate message. For example, should the user hold up the sign language symbol for "I love you," the system and method would track that motion, recognize the symbol, and send the floating kiss onto the recipient's cheek in the video panel as just described. Again, those skilled in the art will appreciate that examples of such images and functionality are capable of vast variation. Hence, the present disclosure should not be understood as limiting the examples to only those listed herein.

Finger 114 as shown in the selection area 111 represents another functionality of the system and method with respect to the creation of entirely new images or sketched art used in videoconferencing via gesture. For example, users can draw on a screen continuously or interacting with the screen as they draw, and it need not necessarily be drawn and then placed. Using motion capture techniques and software applications understood to those of skill in the art, this embodiment of the system and method as described herein could track the movement of a user's figure as the user traced an image in the air, then transpose it into an image that behaved in much the same way as the smiley face 112 described above. For example, if a user were to trace the image of a hat, the system and method as described herein could create a hat that either user could overlay onto the image of either user as represented in either video feed. The hat could then be passed back and forth between the video panels as though it were a real object, in much the same way as the smiley face 112 described above. These features do not necessarily need to be activated by buttons, but could be simply recognized by the system, for example, by detection or tracking. The buttons can be used to clarify functionality. Those skilled in the art will appreciate that examples of such images and functionality are capable of vast variation. Hence, the present disclosure should not be understood as limiting the examples to only those listed herein.

The pencil 115 represents another functionality of the system and method with respect to overlaying text into either visual panel. A user can select the pencil animation, then select a font, size, location or other feature, and type text into the visual panel of his or her choice. Those skilled in the art will appreciate that examples of such images and functionality are capable of vast variation. Hence, the present disclosure should not be understood as limiting the examples to only those listed herein.

Selection area 111 also may include blank space 116, which, in some embodiments, may be used for non-intrusive advertisements. Such advertisements would, on a predetermined schedule, appear in blank space 116 until and unless a user or participant to the videoconference should take an action that occupies that screen space. For example, in some embodiments blank space 116 might overlap with either video panel 103 or 104 or both. In such a scenario, if either visually occupies that visual space in the panel, such as by waving a hand or moving his or her head into that visual space, the advertisement would give way to that occupation and return when the user's movements no longer occupy that visual space.

Figure 2:
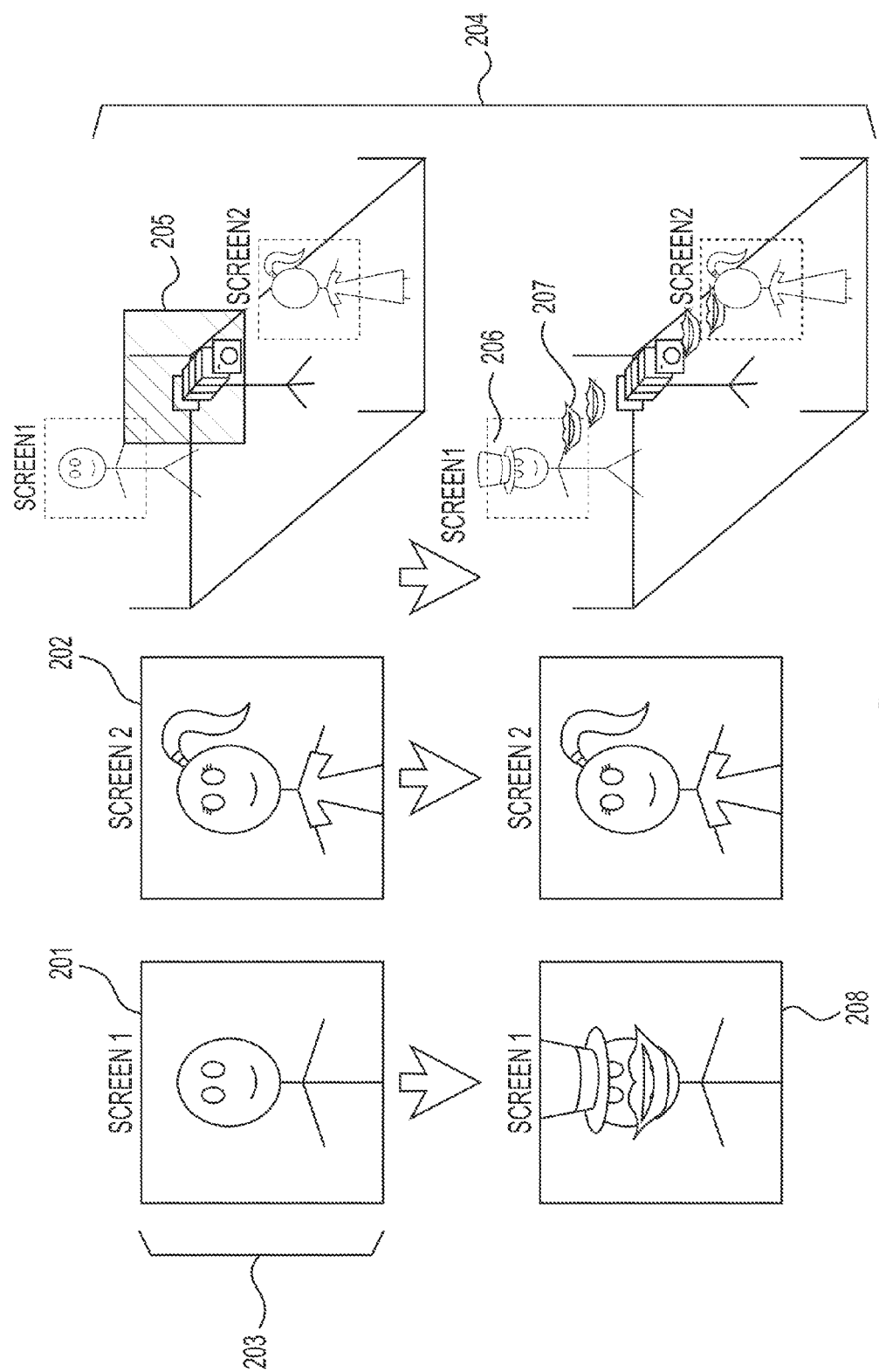
FIG. 2 shows a conceptualization of how transforming the incoming 2D video feed into a 3D representation of the user space allows for seamless interaction with animations and transfer of animations or objects between the spaces with which the feeds represent, in accordance with one aspect of the present invention.

FIG. 2 illustrates the 3D effect that one embodiment of the present system and method disclosed effects on the users or participants to the videoconference. In FIG. 2, the user's screen does not resemble the four-panel embodiment 106 as outlined in FIG. 1, but rather a single-panel full-screen embodiment showing the images of both parties to the videoconference, here depicted as SCREEN1 201 and SCREEN2 202.

Diagram 203 illustrates a "before" videoconferencing scenario where neither user has actuated any icon, emoji or animoji.

Diagram 204 illustrates how the present system and method uses animation to "cross" the "screen barrier" 205. In diagram 204, SCREEN2 202 has used the present system and method to place a hat 206 on SCREEN1 201. Diagram 204 also depicts SCREEN2 in process of placing lips 207 on SCREEN1 201. Note that the lips 207 are here shown as hovering in digital space before they land on the face of Screen1 201.

The "after" image of SCREEN1 208 reveals the placement of the hat 206 and the lips 207 on the user or participant of SCREEN1 201. This is the digitally enhanced version of SCREEN1 201 as modified by the present system and method that would appear in the video feed of some or all of the users or participants to the videoconference.

Figure 3:
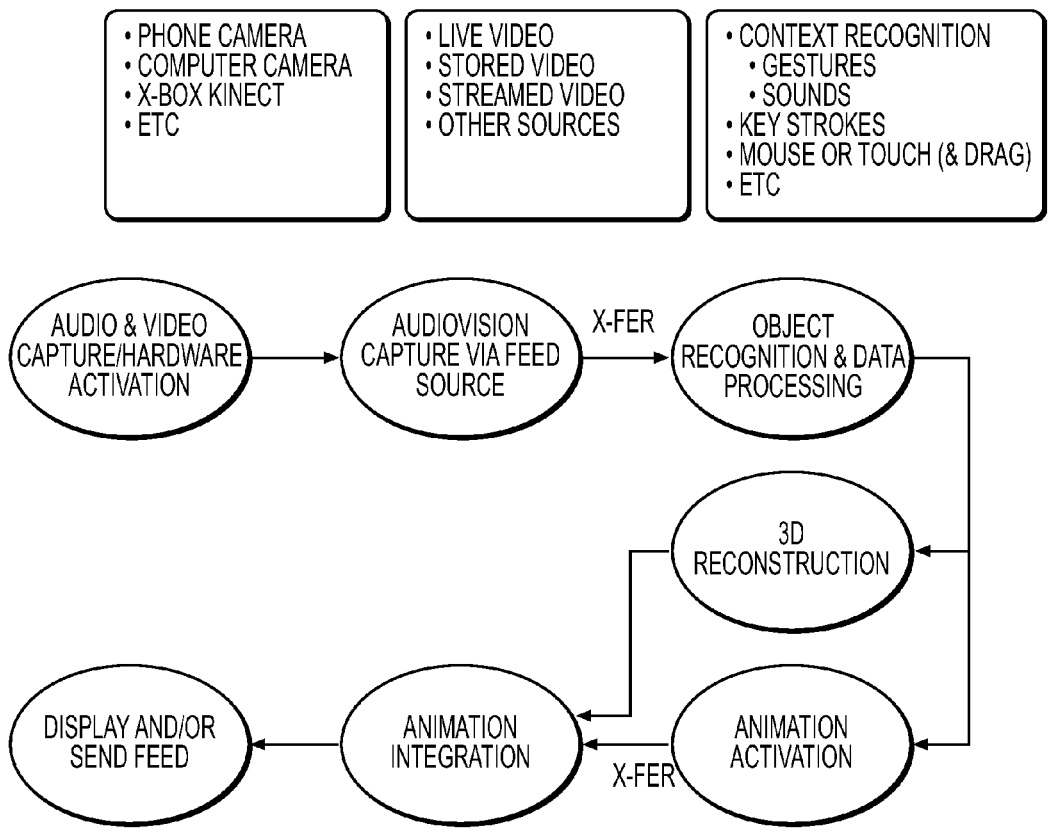
FIG. 3 shows an overview of the processing and communication of a single frame of the output feed in accordance with one aspect of the present invention.

FIG. 3 discloses the operating sequence of one embodiment of the present system and method. First, audiovisual recording hardware is activated. Non-exhaustive examples could include cameras and microphones attached to and operating with phones, computers, tablets, or video game machines. The recording hardware then acquires audiovisual information from the participant or user. Forms of such information could be streaming, stored, or recorded audiovisual information. This information is then transferred ("X-Fer"), for example, into the present system and method's software such that the present system and method's software can manipulate the information. The present system and method's software then constructs a suitable 3D representation of the visual elements in the audiovisual information feed. The present system and method's software also activates appropriate animation sequences. For example, if the present system and method's software detects a human face, an appropriate animation sequence could be the floating kiss sequence previously described herein. Then, the present system and method integrates the animation sequence ("X-Fer") with the 3D representation, such as mapping the kiss animation onto a 3D representation of a user's face created from captured visual information. Lastly, the present system and method displays the rendered audiovisual product to either or both users in the videoconference via the audiovisual feeds and corresponding displays on the users' devices.

Figure 4:
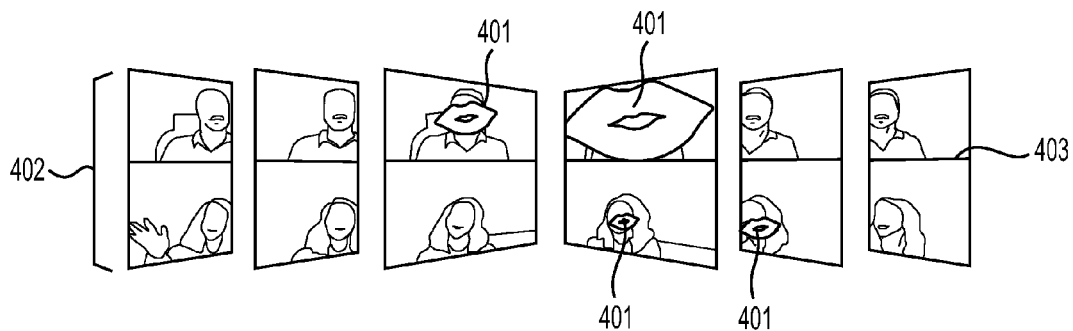
FIG. 4 shows an animation of the user's mouth being detected in accordance with one aspect of the present invention.

FIG. 4 depicts how the present system and method operates in a two-panel display 402 and enables an animation image, here lips 401, to map onto the appropriate location on one user's face, then cross the screen barrier 403 and map onto the appropriate location on the other user's face.

Thus, one embodiment of many possible embodiments of the present system and method begins with a user activating his or her videoconferencing hardware and initiating a videoconference with a second user. Using the four-panel display 106 with selection area 111 as shown on screen 103, the first user can select an animation from the selection area 111, which will appear inside video feed 107 or 108. Or, the first user could select a different icon from inside the selection area that would activate a personalized animation sequence that begins in video feed 107 and ends in video feed 108, or vice versa. Or, a first user could also select an icon from the selection area 111 that activates a gesture-capture sequence wherein the first user motions within view of the hardware camera using the behavior sequences discussed above and the gesture is transcribed into an image incorporated into a personalized animation sequence appearing in either video panel 107 or 108, both 107 and 108, or beginning in either 107 and ending in 108 or vice versa. The user is also able to generate and use these personal animation sequences in substantially similar manner using either the two-panel display 402 or the single-panel display 201.

Another embodiment of many possible embodiments of the present system and method begins with a user activating his or her videoconferencing hardware and initiating a videoconference with a second user. During a videoconference, the first user can select an image, map it onto an image appearing in either video feed, manipulate that image as desired within the video feed, and/or transfer the image between video feeds as desired.

While the foregoing written description of the invention enables one of ordinary skill in the art to make and use the invention, those of ordinary skill in the art will understand and appreciate the existence of variations, combination, and equivalents of the embodiments, methods, and examples provided herein. The invention should, therefore, not be limited by the embodiments and examples disclosed here, but by all embodiments and methods within the scope and spirit of the invention as claimed.

The invention claimed is:

1. A method for providing automatic communications based on computer detected visual cues to generate preselected automatic personalized animation communications during a videoconference on a computer system and network comprising at least one computer processor and non-transitory media and computer memory, the method comprising:
  (a) electronically activating at least one audiovisual capturing device for providing the video conference over the computer system and network;
  (b) recording and transmitting audio data and visual data of users participating in the video conference as audiovisual data sets recorded on non-transitory computer readable media operably connected to the activated audiovisual capturing device;
  (c) storing on non-transitory computer readable media said audiovisual data;
  (d) transmitting at least a portion of said audiovisual data sets, said portion comprising speech and visual images of the users participating in the videoconference over a computer network, wherein said audiovisual capturing device is electronically communicating with at least one computer interface comprising at least one video camera and display screen and at least one audio recording input and audio output for each of said users participating in said video conference;
  (e) electronically detecting and recording, using said computer system and network, cue data corresponding to at least one preselected audio cue in said audio data or at least one preselected video cue in said video data of said audiovisual data sets, said audio or video cue detected from at least a first user of said users;
  (f) electronically recognizing said cue data by software on non-transitory computer readable media in the computer system and network that activates processing and transmission on said computer system and network of at least one preselected personalized visual object correlated with said visual cue;
  (g) electronically and automatically generating using software on non-transitory computer readable media in said computer system and network at least one personalized visual animation communication sequence using said at least one preselected personalized visual object, said generated at least one personalized visual animation communication sequence selected by said first user by selecting a corresponding at least one selection icon on said first user's display screen for display of said at least one personalized visual animation communication sequence to at least one second user of said users; and
  (h) displaying the selected at least one personalized visual animation communication sequence to at least one of said at least one second user of said users on said at least one of said at least one second users' second display screen or audio output; wherein said at least one personalized visual animation communication sequence is provided by electronically generating on said computer system animation data sets comprising a 2D or 3D representation of said at least one personalized visual object to generate, select, and display said at least one personalized visual animation communication sequence.

2. The method of claim 1, wherein said selection icon is associated with at least one preloaded visual image.

3. The method of claim 1, wherein said selection icon is associated with at least one visual image captured by the audiovisual capturing device during the videoconference.

4. The method of claim 1, wherein said selection icon is associated with at least one gesture capture sequence data set, wherein said gesture is captured by said audiovisual capturing device resulting in captured gesture data set rendered into at least one visual image available for integration into said at least one personalized animation communication sequence.

5. The method of claim 1, wherein said selection icon is associated with a text generation sequence wherein said user enters one or more text items and said text item appears in a video feed either in isolation or in combination with an image or a gesture.

6. The method of claim 1, wherein said screen displays an arrangement comprising one or more video feeds, one selection area, and one audiovisual playback area and wherein previously created audio and/or video recordings can be displayed and/or played back during said videoconference.

7. The method of claim 1, wherein said screen displays an arrangement comprising one or more video feeds, one selection area, one audiovisual playback area, and one live content creation area wherein one or more users to said videoconference can create content during said videoconference.

8. The method of claim 1, wherein one or more users to said videoconference sends one or more of said personalized animation communication sequences to another one or more other users in said videoconference wherein said personalized animation communication sequence comprises an animation sequence that appears to begin and end in one video feed.

9. The method of claim 1, wherein said screen contains two or more video feeds and said personalized animation communication sequence comprises an animation sequence that appears to begin in one video feed and end in one or more different video feeds in a continuous manner.

10. A computer program product for use with a videoconferencing device, said computer program product comprising:

a non-transitory computer usable medium having computer readable program code stored in said non-transitory computer usable medium for providing and executing computer program instructions for composing and displaying said user selected personalized animation communication sequence to appear on a suitable screen and cross a screen boundary, said computer readable program code and video conferencing device electronically providing the method of claim 1.

11. An electronic computer system and network comprising a computer program storage device readable by a computing machine, the computer program storage device comprising:

non-transitory computer readable media comprising program code including instructions executable by the computing machine for using the method of claim 1 for providing said at least one first user selected said at least one personalized animation communication sequence and providing said at least one first user selected at least one personalized animation communication sequence to said at least one second user.

12. The computer program product of claim 10, further comprising computer readable program code on non-transitory computer readable media providing computer software that provides said at least one users to draw on said at least one display screen.

* * * * *